United States Patent [19]
Ahrns et al.

[11] 3,886,914
[45] June 3, 1975

[54] LUBRICANT METERING SYSTEM

[75] Inventors: Daniel C. Ahrns; Robert W. Morrison, Jr., both of Westland, Mich.

[73] Assignee: Ford Motor Company, Dearborn, Mich.

[22] Filed: Dec. 14, 1973

[21] Appl. No.: 424,985

[52] U.S. Cl. .................... 123/73 AD; 123/196 M
[51] Int. Cl. ............................................. F01m 1/18
[58] Field of Search .... 123/73 AD, 196 M, 196 CP, 123/196 R, 8.01; 418/84; 261/18 R, 36 A, 69 R

[56] References Cited
UNITED STATES PATENTS

| | | |
|---|---|---|
| 2,998,232 | 8/1961 | Mennesson ...................... 261/36 A |
| 3,140,700 | 7/1964 | Nallinger ........................ 123/73 AD |
| 3,212,485 | 10/1965 | Werner et al. ................... 123/73 AD |
| 3,447,519 | 6/1969 | Marcik et al. ................... 123/73 AD |
| 3,653,784 | 4/1972 | Leitermann et al. ............ 123/73 AD |
| 3,762,380 | 10/1973 | Schultz ............................. 123/73 R |

*Primary Examiner*—Manuel A. Antonakas
*Attorney, Agent, or Firm*—Clifford L. Sadler; Keith L. Zerschling

[57] ABSTRACT

A lubricant metering device for an engine having, in its presently preferred embodiment, a diaphragm mechanism for sensing fuel flow rate and a vacuum mechanism connected to the engine manifold for sensing engine load. The device introduces lubricant into the fuel line of the engine in proportion to the fuel flow rate and the engine load.

11 Claims, 1 Drawing Figure

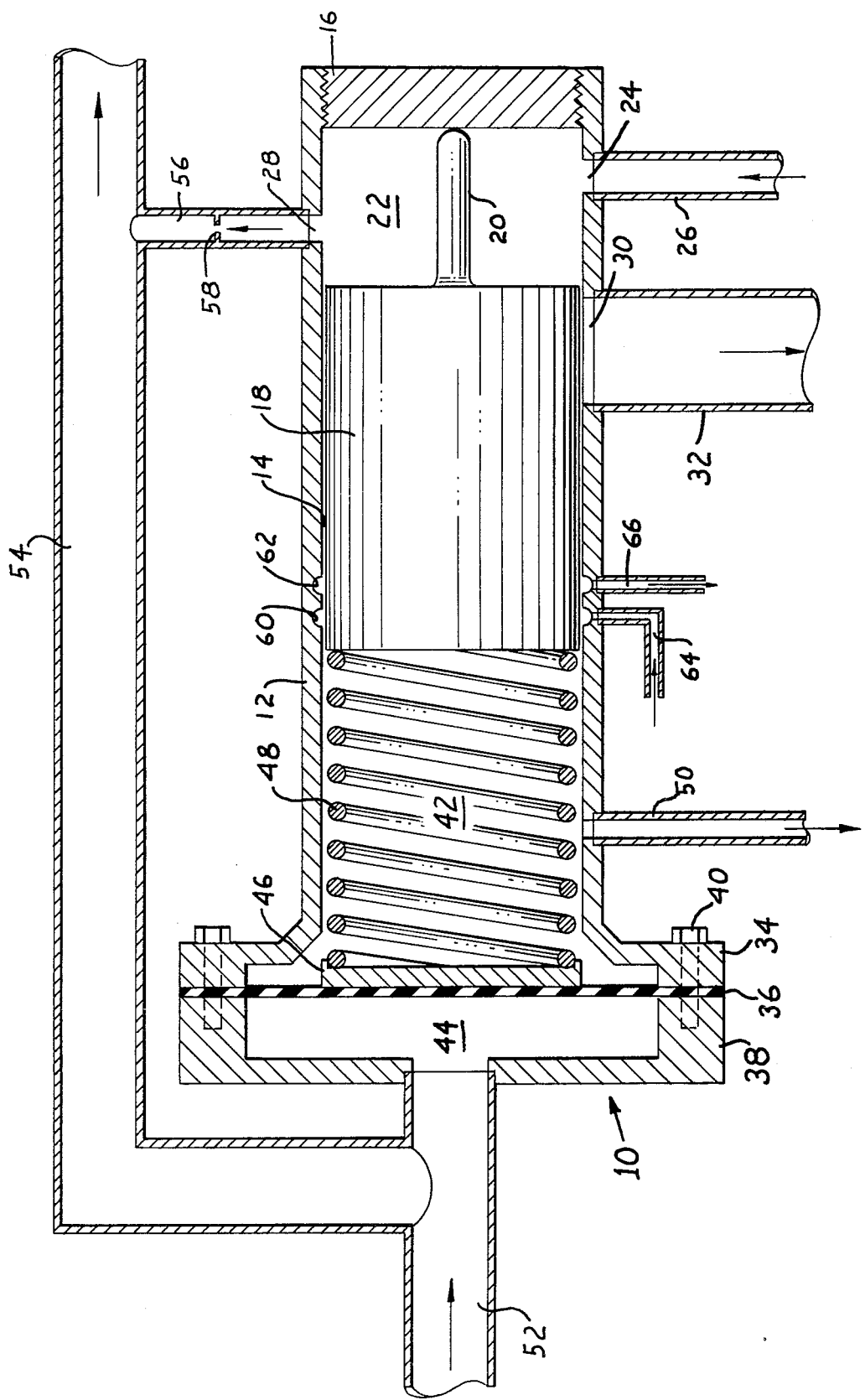

LUBRICANT METERING SYSTEM

BACKGROUND OF THE DISCLOSURE

In certain fuel burning engines, such as two-cycle engines, it is necessary to mix lubricant fluid with the fuel in order to lubricate the engine seals and bearings. The present invention provides a unique lubricant metering system that automatically feeds lubricant to the fuel line in proportion to the fuel flow rate and engine load. With this system, the maximum ratio of lubricant to fuel occurs at maximum fuel flow and maximum engine load. A lower oil to fuel ratio is provided at low engine speeds and low loads such as during engine idle.

BRIEF SUMMARY OF THE DISCLOSURE

In the presently preferred embodiment of the invention a lubricant metering device includes a housing having a central bore. A piston is slidable in the bore and defines a portion of a lubricant metering chamber. A flexible diaphragm is located in the housing. A vacuum chamber is situated between one side of the diaphragm and the piston. The vacuum chamber is connected to the engine manifold. A coil spring is located in the vacuum chamber and is operatively interposed between the diaphragm and the piston. A fuel velocity pressure chamber is situated on the other side of the diaphragm and is connected to the fuel line of the engine.

The lubricant metering chamber has an inlet port that is connected to an oil pump and an outlet port that feeds lubricant through a restrictive orifice to the fuel line. A pressure relief bypass port in the housing is connected to the low pressure side of the engine oil pump and its communication with the lubricant metering chamber depends upon the position of the piston in the bore.

In operation, the lubricant metering device portions the flow of lubricant between the outlet port and the pressure relief bypass port in accordance with the position of the piston within the bore. The piston position is determine by the pressures in the vacuum chamber and in the fuel velocity pressure chamber. The pressure in the vacuum chamber acts on the piston directly. The pressure in the fuel velocity pressure chamber acts upon the piston through the coil spring.

A high vacuum in the vacuum chamber resulting from a high manifold vacuum at a low engine load tends to draw the piston in a direction to open the pressure relief bypass port whereby some lubricant in the metering chamber flows through the bypass port rather than the outlet port. This does not occur at a low manifold vacuum corresponding to a high engine load.

The position of the piston is also controlled by the coil spring which exerts a force in proportion to the position of the diaphragm and the pressure in the fuel velocity pressure chamber. At high fuel flow rates the diaphragm will be deflected toward the piston and the coil spring will exert a greater force upon the piston to insure that the pressure relief bypass port is closed and there is maximum lubricant flow through the outlet port of the lubricant metering chamber. Light spring loads will occur at low fuel flow rates.

Thus, a device is provided which meters lubricant flow to the engine fuel line in response to engine load and fuel flow rate.

BRIEF DESCRIPTION OF THE DRAWING

The many objects and advantages of a lubricant metering system in accordance with this invention will become apparent upon consideration of the following detailed description and the accompanying drawings. The single FIGURE of the drawing shows the presently preferred embodiment of a lubricant metering device in schematic form.

DETAILED DESCRIPTION OF PREFERRED EMBODIMENT

In accordance with the presently preferred embodiment of this invention, a lubricant metering device 10 for an internal combustion engine is provided. The device 10 includes a housing 12 with a central bore 14. The bore 14 is closed at its right end by a screw plug 16. A pressure relief plunger or piston 18 is slidably disposed in the bore 14. The piston 18 has a protruding stem 20 on its right end. The stem 20 assures that the body of the piston 18 will be spaced from the screw plug 16 whereby a lubricant metering chamber 22 is defined.

An inlet port 24 in the lubricant metering chamber 22 is connected to an oil pump (not shown) by an oil line 26. The oil pump is driven at engine speed and provides a lubricant flow that is maintained at a near constant pressure due to its internal pressure relief valve. An outlet port 28 in the metering chamber 22 is connected to an engine fuel line as will be described later.

A pressure relief bypass port 30 in the housing 12 communicates through a conduit 32 to the low pressure side of the engine oil pump. Whether bypass port 30 is in communication with the lubricant metering chamber 22 and the extent of that communication depends upon the position of the pressure relief plunger or piston 18. When the stem 20 of the plunger 18 is positioned against the screw plug 16 as shown in the drawing, the bypass port 30 is sealed.

The housing 12 has a flared end 34. A flexible diaphragm 36 is secured to the flared end 34 by a cap 38 and a series of bolts 40. The diaphragm 36 seals the bore 14.

The interior of the bore 14 between the diaphragm 36 and the piston 18 forms a vacuum chamber 42. The interior of the cap 38 adjacent the diaphragm 36 forms a fuel velocity pressure chamber 44.

A spring seat 46 is secured to the center of the diaphragm 36. A coil-type pressure relief spring 48 is interposed between the spring seat 44 and the pressure relief plunger or piston 18. The spring 48 is disposed in the vacuum chamber 42. The chamber 42 is connected by a vacuum line 50 to an engine manifold whereby the chamber 42 is maintained at a pressure equivalent to engine manifold vacuum pressure.

A source of engine fuel portion 52 has its left end (as seen in the drawing) connected to an engine fuel pump and its right end connected to the cap 38 and the fuel velocity pressure chamber 44. A second fuel line portion 54 connects with the first fuel line portion 52 at one of its ends. Fuel flowing through the fuel line portions 52 and 54 goes to the engine's combustion chamber.

An outlet oil line 56 joins the outlet port 28 of the lubricant metering chamber 22 with the fuel line 54. A restrictive metering orifice 58 is interposed in the line 56 and provides a restriction through which lubricant must flow when passing from the chamber 22 to the fuel line 54.

Annular grooves 60 and 62 formed in the wall of the bore 14 adjacent to the piston 18 provide an air gap seal. The annular groove 60 adjacent to the vacuum chamber 42 is connected by a vent line 64 to atmospheric pressure. Groove 62 is connected by a return line 66 to the sump or low pressure side of the engine oil pump.

OPERATION

The lubricant metering device 10 illustrated in the drawing and described above operates in the following manner.

Lubricating oil is delivered to the engine for the purpose of lubricating engine seals and bearings by means of the fuel line 54 which is connected to the engine's carburetor. The device 10 controls the amount of lubricant that is delivered to the fuel line 54.

The lubricant line 26 feeds lubricant from the engine oil pump to the lubricant metering chamber 22. Fluid in the chamber 22 will flow under pressure through the outlet port 28, orifice 58 and to the fuel line 54. The amount of lubricant flowing through the orifice 58 will depend upon the pressure of the fluid at the outlet port 28. The fluid pressure at the port 28 in the chamber 22 is controlled by the position of the piston 18 and the extent to which the pressure relief port 30 is exposed. For an example, when the piston 18 is in its right-hand position, as shown in the drawing, the pressure relief port 30 is closed and maximum lubricant flow will occur through the orifice 58 to the fuel line 54.

The piston or pressure relief plunger 18 is positioned in the bore 14 in response to the vacuum in chamber 42 and the fuel pressure head in chamber 44. The pressure in chamber 42 is equivalent to engine manifold vacuum. At high engine loads there is a small vacuum in chamber 42 and at light engine loads there is a maximum vacuum. Therefore under high engine load conditions and with only nominal vacuum in chamber 42, the coil spring 48 will hold the piston 18 in a righthand direction whereby the bypass port 30 will be sealed and maximum lubricant fluid flow will occur through the orifice 58. At light engine loads, such as occurs during engine idle, maximum vacuum will exist in the chamber 42 and the piston 18 will be drawn to the left to expose the bypass port 30. Under these circumstances, a drop of pressure will occur in the lubricant metering chamber 22 and some lubricant will flow through the bypass port 30 rather than through outlet port 28.

The position of the pressure relief plunger or piston 18 is also modulated in accordance with the pressure in chamber 44. The pressure in chamber 44 is equal to the fuel velocity pressure head and is proportional to the rate of fuel flow through the fuel line 52. Under high pressure head conditions in chamber 44, the diaphragm 38 will be displaced to the right and thereby increase the loading of the spring 48 upon the piston 18. Under these circumstances the piston 18 will be urged to a position sealing the bypass port 30. Therefore, a maximum rate of lubricant flow will occur through the outlet port 28 and line 56.

The lubricant metering device is connected to the engine's fuel system at a point where the velocity or dynamic pressure in chamber 44 will be proportional to fuel flow through the line portions 52 and 54 and where there will be no significant variation in static pressure under normal operating conditions.

When there is a low rate of fuel flow such as during engine idle, the diaphragm 38 will be displaced to the left from its high flow rate position and thereby decrease the loading of the spring 48 upon the piston 18. The piston 18 will become more responsive to the vacuum in the chamber 42 thereby permitting the piston 18 to shift to the left and expose the pressure relief or bypass port 30. Opening the bypass port 30 will cause some lubricant to return to the oil pump rather than being delivered through the outlet port 28 to the fuel line 54.

SUMMARY

In accordance with the present invention, a lubricant metering device is provided that automatically controls the flow of lubricating fluid to a fuel line in response to engine load (engine manifold vacuum) and fuel flow rate (fuel flow pressure head). The device automatically provides a high ratio of lubricant to fuel under those conditions requiring greater amounts of lubricant at the engine seals and bearings. Therefore maximum lubricant is provided under high speed and high load conditions. The device automatically reduces the flow of lubricant to the engine under those conditions where maximum lubricant is not needed. For an example, reduced lubrication is appropriate at low load and low speed such as engine idle.

The foregoing description presents the presently preferred embodiment of this invention. Modifications and alterations may occur to those skilled in the art that will come within the scope and spirit of the following claims.

We claim:

1. A lubricant metering system for an engine comprising:
    a fuel flow sensing means constructed to provide a signal proportional to engine fuel flow rate,
    a lubricant supply means constructed to provide a flow of lubricant under pressure,
    a lubricant metering device connected to said supply means and constructed to control the flow of lubricant from said supply means,
    said lubricant metering device being connected to said fuel flow sensing means and constructed to portion the output of said supply means in response to said signal.

2. A lubricant metering system according to claim 1 and including:
    an engine fuel supply means constructed to supply a flow of fuel for said engine,
    said lubricant metering device having an outlet,
    means connected to outlet and to said fuel supply means and constructed to combine lubricant flow and fuel flow.

3. A lubricant metering system for an engine comprising:
    an engine load sensing means constructed to provide a signal proportional to engine load,
    a lubricant supply means constructed to provide a flow of lubricant under pressure,
    a lubricant metering device connected to said supply means and constructed to control the flow of lubricant from said supply means,
    said lubricant metering device being connected to said engine load sensing means and constructed to portion the output of said supply means in response to said signal, said engine load sensing means being connected to an engine manifold vacuum source and constructed to provide said signal in proportion to the engine manifold vacuum pressure.

4. A lubricant metering system for an engine comprising:
a fuel flow sensing means constructed to provide a first signal proportional to engine fuel flow rate,
an engine load sensing means constructed to provide a second signal proportional to engine load,
a lubricant supply means constructed to provide a flow of lubricant under pressure,
a lubricant metering device connected to said supply means and constructed to control the flow of lubricant fluid from said supply means,
said lubricant metering device being connected to said fuel flow sensing means and to said engine load sensing means and constructed to portion the output of said supply means in response to said first and second signals.

5. A lubricant metering system according to claim 4 and including:
an engine fuel supply means constructed to supply a flow of fuel for said engine,
said lubricant metering device having an outlet,
means connected to said outlet and to said fuel supply means and constructed to combine lubricant flow and fuel flow.

6. A lubricant metering system according to claim 5 and including:
said engine load sensing means being connected to an engine manifold vacuum source and constructed to provide said second signal in proportion to engine manifold vacuum pressure.

7. A lubricant metering system according to claim 4 and including:
said engine load sensing means being connected to an engine manifold vacuum source and constructed to provide said second signal in proportion to engine manifold vacuum pressure,
an engine fuel supply means constructed to provide a flow of fuel for said engine,
said lubricant metering device having an outlet,
means connected to said outlet and to said fuel supply means and constructed to combine lubricant flow and fuel flow.

8. A lubricant metering system for an engine comprising:
a lubricant metering device having an inlet port, an outlet port and a pressure relief bypass port,
said inlet port being connected to a lubricant supply means constructed to provide a flow of lubricant under pressure,
said bypass port being connected to a low pressure lubricant source,
said outlet port being connected to an engine fuel supply means constructed to provide a flow of fuel for said engine,
a fuel flow sensing means connected to said engine fuel supply means and constructed to provide a first signal proportional to fuel flow rate at said engine fuel supply means,
an engine load sensing means constructed to provide a second signal proportional to engine load,
said lubricant metering device being connected to said fuel flow sensing means and to said engine load sensing means and constructed to portion the flow of lubricant through said outlet port and through said bypass port in response to said first and second signals.

9. A lubricant metering system according to claim 8 and including:
said engine load sensing means being connected to an engine manifold vacuum source and constructed to provide said second signal in proportion to engine manifold vacuum pressure.

10. A lubricant metering system for an engine comprising:
a lubricant metering device having housing with a central bore,
a piston slidable in said bore and defining, in part, a lubricant metering chamber,
said metering chamber having an inlet port, an outlet port and a pressure relief bypass port,
a diaphragm disposed in said bore,
a vacuum chamber situated between one side of said diaphragm and said piston,
a fuel velocity pressure chamber situated on the other side of said diaphragm,
said vacuum chamber being in communication with an engine manifold vacuum pressure source,
a coil spring interposed between said diaphragm and said piston,
an engine fuel line,
communication means connecting said fuel velocity pressure chamber with said fuel line,
said piston being displacable between first and second positions in said bore,
said piston being constructed to seal said bypass port when in said first position and said piston being constructed to permit communication between said bypass port and said metering chamber when in said second position,
said piston being urged from said first position to said second position in response to a vacuum in said vacuum chamber,
said piston being urged from said second position to said first position in response to a fuel velocity pressure in said fuel velocity pressure chamber.

11. A lubricant metering system for an engine comprising:
a lubricant metering device having a housing with a central bore,
a piston slidable in said bore and in part defining a lubricant metering chamber and a vacuum chamber,
said metering chamber having an inlet port, an outlet port and a pressure relief bypass port,
said inlet port being constructed to be connected to the output of a lubricant pressure source,
said pressure relief bypass port being constucted to be connected to the low pressure input of said lubricant pressure source,
said outlet port being connected to an engine fuel line,
said vaccum chamber being in communication with an engine manifold vacuum pressure source,
said piston being displaceable between first and second positions in said bore,
said piston being constructed to seal said bypass port when in said first position and to permit communication between said bypass port and said metering chamber when in said second position,
a coil spring engaging said piston and urging said piston from said second position to said first position,
said piston being urged from said first position to said second position in response to a vacuum in said vacuum chamber.

* * * * *